(12) United States Patent
Dai et al.

(10) Patent No.: US 8,842,603 B2
(45) Date of Patent: Sep. 23, 2014

(54) METHOD AND APPARATUS FOR DETECTION OF NETWORK HAVING MULTIPLE IP-ADDRESS CAPABILITY

(75) Inventors: Brian Dai, Itasca, IL (US); Jerry Mahler, Hoffman Estates, IL (US); Ying Chun Xu, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1124 days.

(21) Appl. No.: 11/963,053

(22) Filed: Dec. 21, 2007

(65) Prior Publication Data
US 2009/0161601 A1 Jun. 25, 2009

(51) Int. Cl.
  *H04W 4/00* (2009.01)
  *H04W 8/26* (2009.01)
  *H04L 29/12* (2006.01)
  *H04W 8/06* (2009.01)
  *H04W 80/04* (2009.01)

(52) U.S. Cl.
  CPC ........... *H04W 8/26* (2013.01); *H04L 29/12311* (2013.01); *H04L 61/6077* (2013.01); *H04W 8/06* (2013.01); *H04W 80/04* (2013.01); *H04L 61/2084* (2013.01); *H04L 29/12952* (2013.01)
  USPC ............................. 370/328; 370/313; 370/331

(58) Field of Classification Search
  None
  See application file for complete search history.

(56) References Cited

U.S. PATENT DOCUMENTS

| | | | |
|---|---|---|---|
| 6,988,146 B1* | 1/2006 | Magret et al. ................. | 709/238 |
| 7,069,338 B2 | 6/2006 | Popovich et al. | |
| 2002/0067704 A1 | 6/2002 | Ton | |
| 2003/0021275 A1* | 1/2003 | Shabeer ......................... | 370/393 |
| 2003/0224757 A1 | 12/2003 | Dyck et al. | |
| 2005/0114543 A1 | 5/2005 | Popovich et al. | |
| 2007/0177557 A1 | 8/2007 | Mukherjee et al. | |
| 2008/0101315 A1* | 5/2008 | Bachmutsky ................. | 370/342 |
| 2009/0003359 A1* | 1/2009 | Yegani et al. ................. | 370/401 |

FOREIGN PATENT DOCUMENTS

KR  10-2006-0011354  2/2006
WO  WO 2007039016 A1 * 4/2007

OTHER PUBLICATIONS

PCT Search Report, PCT/US2008/084509.
Perkins, C. "RFC 3344—IP Mobility Support for IPv4", *RFC 3344—IP Mobility Support for IPv4*, published by the Network Working Group of the Internet Society in Aug. 2002, with C. Perkins Editor, (Aug. 1, 2002).
Seybold, Andrew M., "A-IMS—Fixing the Flaws", *3G Today*, Aug. 2006, vol. 3, issue 4.
Tom "A-IMS to Improve or Fracture the IMS Standard?", *VOIP & Gadgets Blog*, Jul. 27, 2006.

* cited by examiner

*Primary Examiner* — Ian Moore
*Assistant Examiner* — Jackie Zuniga Abad
(74) *Attorney, Agent, or Firm* — Faegre Baker Daniels LLP (57) ABSTRACT

A method (200) and apparatus for determining whether a network (111) associated with a foreign agent (104) is multiple IP address interface compatible in a mobile node (101) is provided. The foreign agent (104), upon detection of the mobile node (101), composes an agent advertisement (400) that includes one or more flag bits (405). The foreign agent (104) sets one of the one or more flag bits (405) to indicate multiple IP address interface compatibility. Upon receiving the agent advertisement (400), the mobile node (101) configures itself for multiple IP address interface datagram communication. Where the mobile node (101) has not already received a primary IP address (617) from the foreign agent (104), it requests one. The mobile node (101) then requests a secondary IP address (618) from a home agent (103) through the foreign agent (104).

15 Claims, 4 Drawing Sheets

METHOD AND APPARATUS FOR DETECTION OF NETWORK HAVING MULTIPLE IP-ADDRESS CAPABILITY

BACKGROUND

1. Technical Field

This invention relates generally to networks for wireless communication with portable electronic devices, and more specifically to a method and apparatus for mobile nodes, such as mobile telephones and portable computers, to determine whether a foreign network is capable of multiple Internet Protocol (IP) address communication.

2. Background Art

Mobile device communication with networks is becoming more advanced as the mobile devices are equipped with new applications and features. Not too long ago, a mobile telephone was only used for voice communication. Analog signals were capable of accommodating high-quality voice communication across networks. As these mobile devices became more advanced, the analog networks gave way to digital networks. Mobile telephones became mobile communication devices capable not only of transmitting voice calls, but also text messages, multimedia messages, pictures, video, music, and so forth. Further, other devices, including personal digital assistants and portable computers, began to use the "cellular" networks originally designed for mobile telephones. Designers quickly realized that communication standards were required to facilitate transfer of mobile devices between cells and to facilitate the variety of communication modes associated with each device.

Mobile Internet Protocol communication (Mobile IP) became an accepted standard for such communication. Mobile IP is a network-based communication protocol that facilitates digital, packet based "datagram" communication between mobile devices, referred to herein as "mobile nodes," to travel from one network to another while maintaining advanced communication capability. One recognized standard associated with a current network technology is referred to as IPv4, and is set forth in several standards, including "RFC 3344—IP Mobility Support for IPv4," published by the Network Working Group of the Internet Society in August, 2002, with C. Perkins Editor, which is incorporated herein by reference.

IP mobility support for IPv4 " . . . specifies protocol enhancements that allow transparent routing of IP datagrams to mobile nodes in the Internet. Each mobile node is always identified by its home (IP) address, regardless of its current point of attachment to the Internet. While situated away from its home, a mobile node is also associated with a care-of (IP) address, which provides information about its current point of attachment to the Internet. The protocol provides for registering the care-of address with a home agent. The home agent sends datagrams destined for the mobile node through a tunnel to the care-of address. After arriving at the end of the tunnel, each datagram is then delivered to the mobile node."

IP mobility support for IPv4 permits mobile nodes, such as mobile telephones and personal digital assistants, to travel between various networks across geographic regions while maintaining their datagram communication capability with each network. Without standards such as this, a mobile node would "drop" communication channels as it transitioned from one network to another. This is true because the IP addresses associated with IP-based communication are generally location specific. When a person takes a mobile node from one network to another, that mobile node is incapable of employing the home IP address for communication with not in its home network.

While networks and devices employing the IP mobility support for IPv4 work well in practice, they do have limitations. One such limitation is that the Internet Multimedia Standard (IMS) for IPv4, in some applications, presumes that datagram content for applications and communication will be Session Initiation Protocol (SIP) based communication. As such, these networks are configured to efficiently handle SIP-based content, but generally are either inefficient or incapable of handling non-SIP based content. Further, traditional IMS networks are sometimes not well suited to regulate policy controls over SIP and non-SIP applications, nor are they effective at prioritizing or allocating network resources such as quality of service, security, packet flow optimization, or service provider access control in accordance with subscriber service contracts.

To alleviate some of these problems, designers have been working on a new IMS, known by some as A-IMS or "Advances to IMS." Specifically designers of hardware and networks have proposed standards that employ a dual or multiple-IP address communication scheme. By way of example, in one embodiment, a mobile node communicates through a "dual anchoring" scheme. In dual-anchoring, agents of networks establish two IP addresses with each mobile node. A first may be anchored in a bearer manager associated with a foreign network, while another is anchored in a bearer manager associated with a home network. Contracts with users and policies associated with service providers determine which IP address is used for which application. By way of example, a time sensitive application such as a game or video application may use the IP address associated with the foreign network, while other less-time sensitive applications may use the IP address associated with the home network.

Such a new network protocol presents problems for mobile node manufacturers. Single-IP address devices are not configured to communicate with multiple-IP address interface based systems. Similarly, a mobile node attempting to employ multiple IP address communication with a legacy network will not be successful in establishing multiple IP addresses. Consumers desire devices that work across a variety of networks, including single IP address and multiple IP address based networks.

There is thus a need for a method and apparatus capable of differentiating between single IP address based networks and multiple IP address based networks.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to determining whether a network associated with a foreign agent is multiple IP-address interface compatible. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of determining whether a network associated with a foreign agent is multiple IP address compatible as described herein. The non-processor circuits may include, but are not limited to, a radio receiver, a radio transmitter, signal drivers, clock circuits, power source circuits, and user input devices. As such, these functions may be interpreted as steps of a method to perform both the multiple IP address compatibility determination and the steps of establishing communication. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

In a multiple IP address enabled network associated with embodiments of the present invention, a mobile terminal is capable of communicating with dual IP addresses: a first is anchored in the bearer manager associated with a foreign network; and another is associated with a bearer manager in a home network. Various factors can control which IP address is used for which applications. One factor is that of the policies or contracts associated with the service provider for the mobile node. The dual IP address configuration can also allow latency sensitive applications to use the foreign anchored IP address, whereas applications requiring greater levels of service provider control can use the home anchored IP address.

To dynamically support both this new dual IP address architecture, and to provide a mobile node capable of communication with both single IP address based architectures and dual IP address based architectures, embodiments of the present invention provide methods and devices for automatic detection of a foreign network's IP interface capabilities.

In one embodiment, a method and apparatus in accordance with the invention is suitable for use with A-IMS networks. A-IMS defines a network standard defined by a consortium of several communications equipment providers, including Motorola, Inc., Cisco Systems, Inc., Starent Networks Corp., and Verizon Wireless, Inc. In one embodiment of the invention, a mobile node first establishes simple IP-based communications with a foreign network, and more particularly with a foreign agent associated with the foreign network. The simple IP communication is established via a point-to-point protocol (PPP) negotiation.

Next, a bearer manager working in conjunction with the foreign agent prepares and transmits an agent advertisement to the mobile node. The agent advertisement, when configured in accordance with embodiments of the present invention, initiates the second mobile registration process. By setting one or more bits of the agent advertisement, the foreign agent is able to announce whether it is configured with a multiple IP interface. By reading the agent advertisement, the mobile node can establish a second IP address, and can thereafter dynamically choose which IP address to employ for a particular datagram communication. Where the bit indicates that the foreign agent is not configured with a multiple IP interface, or where the section of the agent advertisement is not used, the mobile node communicates with the foreign agent via a single IP address as is the case in traditional IMS networks.

In accordance with embodiments of the invention, one or more bits of the agent advertisement are configured to indicate the availability of a multiple IP address network. In one embodiment, one reserved bit of the agent advertisement set forth in RFC 3344 mentioned above is set when the network associated with the foreign agent is dual IP address interface compatible. In RFC 3344, there are 8 bits used for various purposes in the agent advertisement. These 8 bits are followed one byte that is designated as a reserved field. In an exemplary embodiment, the first bit of this byte is used to indicate a dual IP address interface. For legacy or traditional networks, this bit is either set to zero or is not used by the foreign agent. The mobile node then reads the bit to determine the capabilities of the corresponding network. Where the bit is zero or is unused (i.e., where the bit is ignored by the foreign agent), the mobile node communicates traditionally with a single IP address. The mobile node may further send out an agent solicitation message asking that the foreign agent reply with an agent advertisement message.

Figure 1:
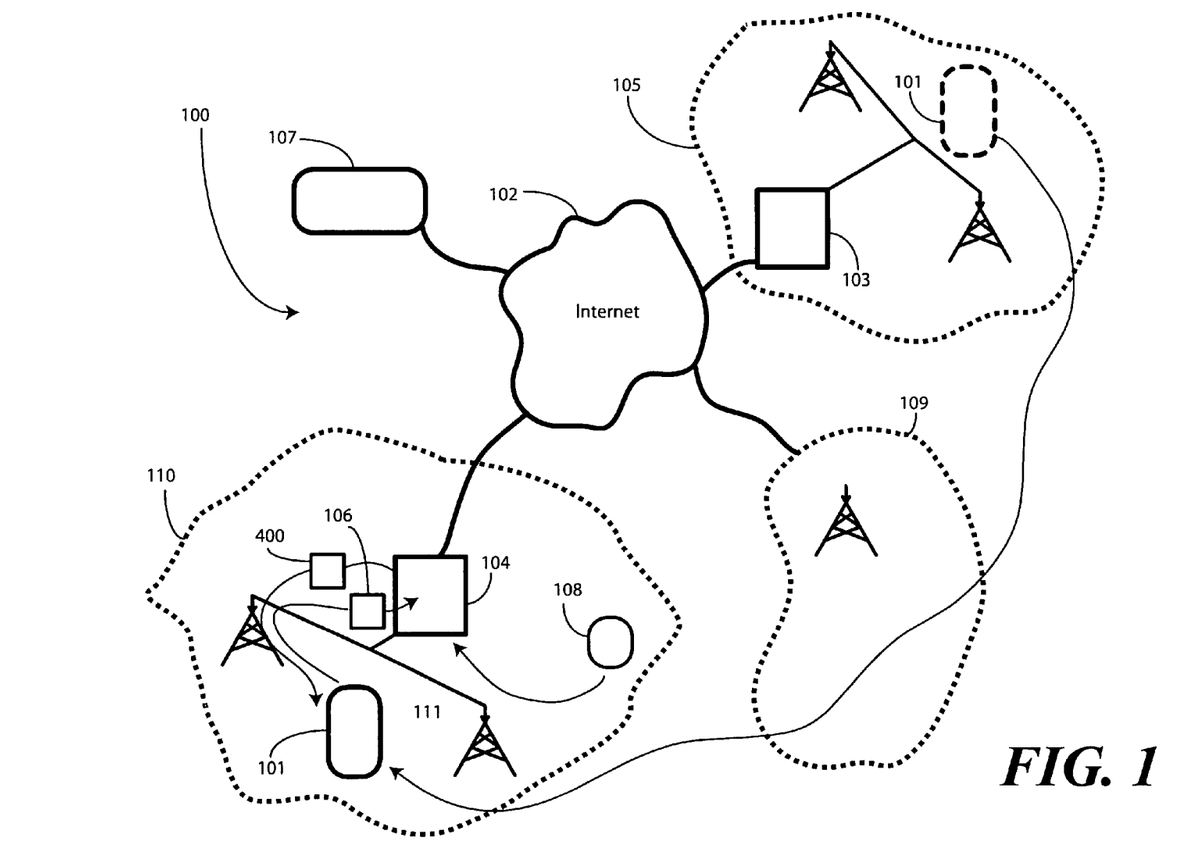
FIG. 1 illustrates one embodiment of a network configuration having a multiple IP address interface capability in accordance with the invention.

Turning now to FIG. 1, illustrated therein is one embodiment of a network configuration in accordance with embodiments of the invention. A mobile node 101 represents a portable electronic communication device, such as a mobile telephone, personal digital assistant, media player, gaming device, portable computer or other similar device. The mobile node 101 is generally operative in an area 105 or region in which communication occurs through a home agent 103. This area 105 may be one near a user's home or workplace that is serviced by a service provider with which the user has a service contract. The mobile node 101 transacts datagram communication to a network 102, such as the Internet, through the home agent 103. This datagram communication can be with other devices 107 or routers that are also in communication with the network 102.

When the user travels with the mobile node 101, the user may pass through various regions 109, 110 that are serviced by providers other than the user's service provider. In these regions, the mobile node 101 transacts datagram communication 108 with the network 102 through a foreign agent 104.

When the mobile node 101 enters a region 110 served by the foreign agent 104, the foreign agent 104 detects the presence of the mobile node 101. To begin communication, the foreign agent 104 composes an agent advertisement 400 (See FIG. 4). The agent advertisement 400 constitutes one part of the registration process. In accordance with embodiments of the invention, the agent advertisement 400 includes information that is provided as one or more flag bits of one or more fields of the agent advertisement 400 to indicate whether the network 111 associated with the foreign agent 104 is multiple IP address compatible.

Figure 4:
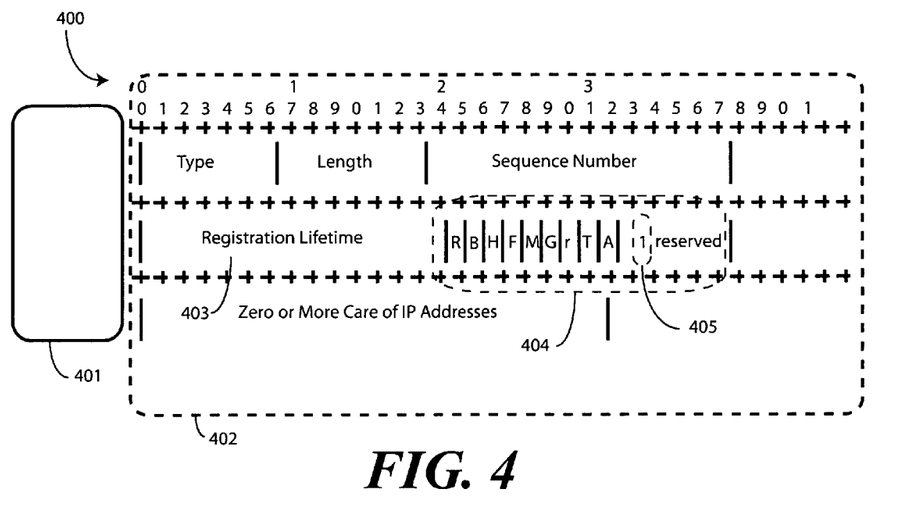
FIG. 4 illustrates one embodiment of a portion of an agent advertisement in accordance with embodiments of the invention.

Turning briefly to FIG. 4, illustrated therein is one such agent advertisement 400. The agent advertisement 400 includes one or more Internet control message protocol (ICMP) router advertisement fields 401 and a mobility agent advertisement extension 402. The mobility agent advertisement extension 402 includes a registration lifetime 403 and the one or more flag bits 404. The mobility agent advertisement extension 402 can include one or more care of addresses 406 as well. The one or more flag bits 404, in one embodiment, fall between the $25^{th}$ and $32^{nd}$ bits of the mobility agent advertisement extension 402.

One of the one or more flag bits 402 is used to indicate whether the network 111 associated with the foreign agent (104) is multiple-IP address compatible. In one embodiment, the $25^{th}$ bit 405 of the mobility agent advertisement extension 402 is used to indicate a multiple IP address interface compatibility. In this embodiment, where the $25^{th}$ bit 405 is 1, the network (111) is multiple IP address interface compatible. Where the $25^{th}$ bit 405 is 0, or where the one or more flag bits 404 are ignored, the network (111) is single IP address interface compatible. Of course, it will be clear to those of ordinary skill in the art having the benefit of this disclosure that the reverse logic, or another of the one or more flag bits 404 could equally be used.

Turning back to FIG. 1, upon receiving the agent advertisement 400 from the foreign agent 104, the mobile node 101 reads the agent advertisement 400 to determine whether one of the one or more flag bits (404) is indicative of the network 111 being multiple IP address interface compatible. Where the one or more flag bits (404) indicates that the network 111 associated with the foreign agent 104 is multiple IP address compatible, the mobile node 101 configures itself for communication with the network 111 associated with the foreign agent 104. This configuration process will lead to two IP addresses being associated with the mobile node 101. For example the configuration process can include examining a primary mobile node IP interface to determine whether a primary IP address has been assigned. Where it has not, the mobile node 101 may transmit a registration message 106 to the foreign agent 104 requesting a primary IP address.

Once the primary IP address is obtained, the mobile node can request a secondary IP address from the home agent 103 through the foreign agent 104 for its secondary IP interface. Where the one or more flag bits (404) indicates that the network 111 associated with the foreign agent 104 is not multiple IP address interface compatible, the mobile node 101 configures itself for datagram communication through a single IP address.

When the foreign agent 104 receives the registration message 106 from the mobile node 101, the foreign agent 104 examines the registration message 106 for a care of IP address (406). Where the care of IP address (406) corresponds to the foreign agent 104, the foreign agent 104 establishes the primary IP address with its bearer manager for the mobile node 101 when it receives the registration message 106 for the first IP interface of the mobile node 101. The foreign agent 104, in one embodiment, then establishes the secondary IP address for the mobile node 101 with the home agent 103 (and its bearer manager) upon receiving a registration message (not shown) for the second IP interface of the mobile node 101. Where the care of IP address (406) fails to correspond to the foreign agent 104, the foreign agent 104 forwards the registration message 106 to the home agent 103 to establish the secondary IP address with the bearer manager of the home agent 103. In such a scenario, the mobile node 101 generally will have obtained the primary IP address during an initial PPP negotiation with the foreign agent 104. The mobile node 101 thus uses the primary IP address as a care of IP address to obtain the secondary IP address from the home agent 103. The foreign agent 104 therefore forwards the registration message 106 to the home agent 103 to establish the secondary IP address.

Presuming multiple IP address interface compatibility of the network 111 associated with the foreign agent 104, once the registration process is complete and the primary and secondary IP addresses have been established, the home agent 103 and the foreign agent 104 may negotiate the communication protocols and channels. This negotiation can include which IP address to use for which type of datagram communication, how long the mobile node 101 will be anchored with the bearer manager of the foreign agent 104, and so forth. Similarly, in some embodiments, the mobile node 101 is programmed with protocols and rules corresponding to the agreement with the service provider as to the selection of which IP address is to be used with a particular datagram communication.

Figure 2:
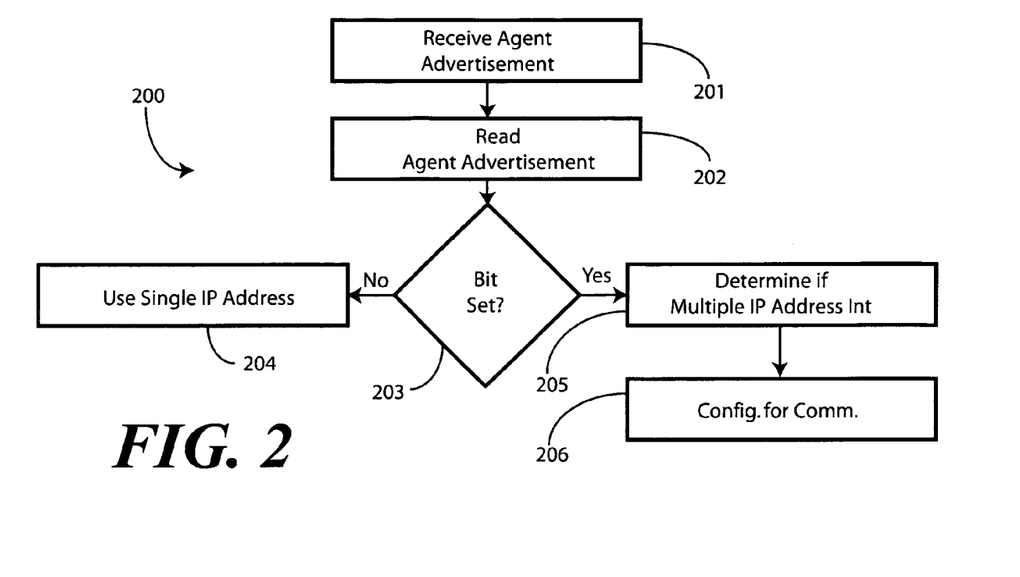
FIG. 2 illustrates a method of determining whether a network associated with a foreign agent is multiple IP address compatible in accordance with embodiments of the invention.

Turning now to FIG. 2, illustrated therein is one method 200, suitable for use with a mobile node (101), for determining whether a network (111) associated with a foreign agent (104) is multiple IP address interface compatible in accordance with embodiments of the invention. The method of FIG. 2 is suitable for coding as executable software instructions to be embedded in a memory device of the mobile node (101) and operable with a processor.

At step 201, the mobile node (101) receives the agent advertisement (400) from the foreign agent (104). In one embodiment, the agent advertisement (400) includes information provided in the one or more flag bits (405) in the fields of the agent advertisement (400) to indicate whether the network (111) associated with the foreign agent (104) is multiple IP address interface compatible.

At step 202, the mobile node (101) reads the agent advertisement (400) to determine whether the one or more flag bits (405) indicates the multiple IP address interface compatibility. This is determined at decision 203. Note that where the network is a legacy network, i.e., a network without dual IP address interface compatibility, the foreign agent associated with such a network will ignore the one or more flag bits of the agent advertisement. As such, the mobile node (101) will see that the bit is not set and will communication as with traditional IPv4 networks. Further, where the foreign agent (104) sets the bit to zero (where positive logic is used), the mobile node (101) will communicate with the network traditionally at step 204.

Where the one or more flag bits (405) is indicative of multiple IP address interface compatibility, however, the mobile node (101) determines this at step 205 by detecting the bit (405) being set. The mobile node (101) then begins to configure itself for communication with a multiple IP address compatible network at step 206.

Figure 3:
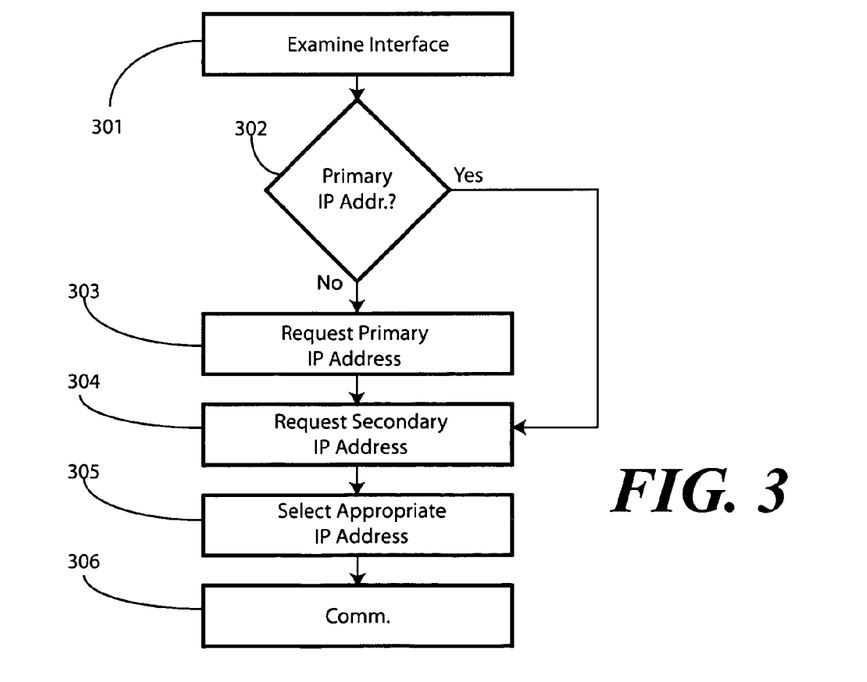
FIG. 3 illustrates one method of configuring a mobile node to communicate with a multiple IP address interface in accordance with embodiments of the invention.

Turning now to FIG. 3, illustrated therein is one embodiment of a method—step 206 of FIG. 2—of configuring the mobile node for communication with a multiple IP address compatible network in accordance with embodiments of the invention. At step 301, the mobile node (101) examines its primary mobile node IP interface to determine whether a primary IP address has been assigned. Note that this primary IP address may be assigned during registration through PPP negotiation between the mobile node (101) and the foreign agent (104). The mobile node (101) determines whether the primary IP address has been assigned and is stored in the primary mobile node IP interface at decision 302.

Where the primary IP address has been assigned, the mobile node (101) requests a secondary IP address from the home agent (103) through the foreign agent (104) at step 304. Where the primary IP address has not been assigned, the mobile node (101) first requests a primary IP address from the foreign agent (104) at step 303. Once the primary IP address has been established with the bearer manager of the foreign agent (104), the mobile node (101) requests a second IP address for a secondary IP mobile node IP interface. This request is made to the home agent (103) through the foreign agent (104) at step 304.

Once both IP addresses have been assigned, the mobile node (101), in accordance with rules or other decision making algorithms encoded as executable firmware stored within the mobile node (101), determines which IP address is to be used for a particular datagram communication at step 305. At step 306, communication takes place.

Figure 5:
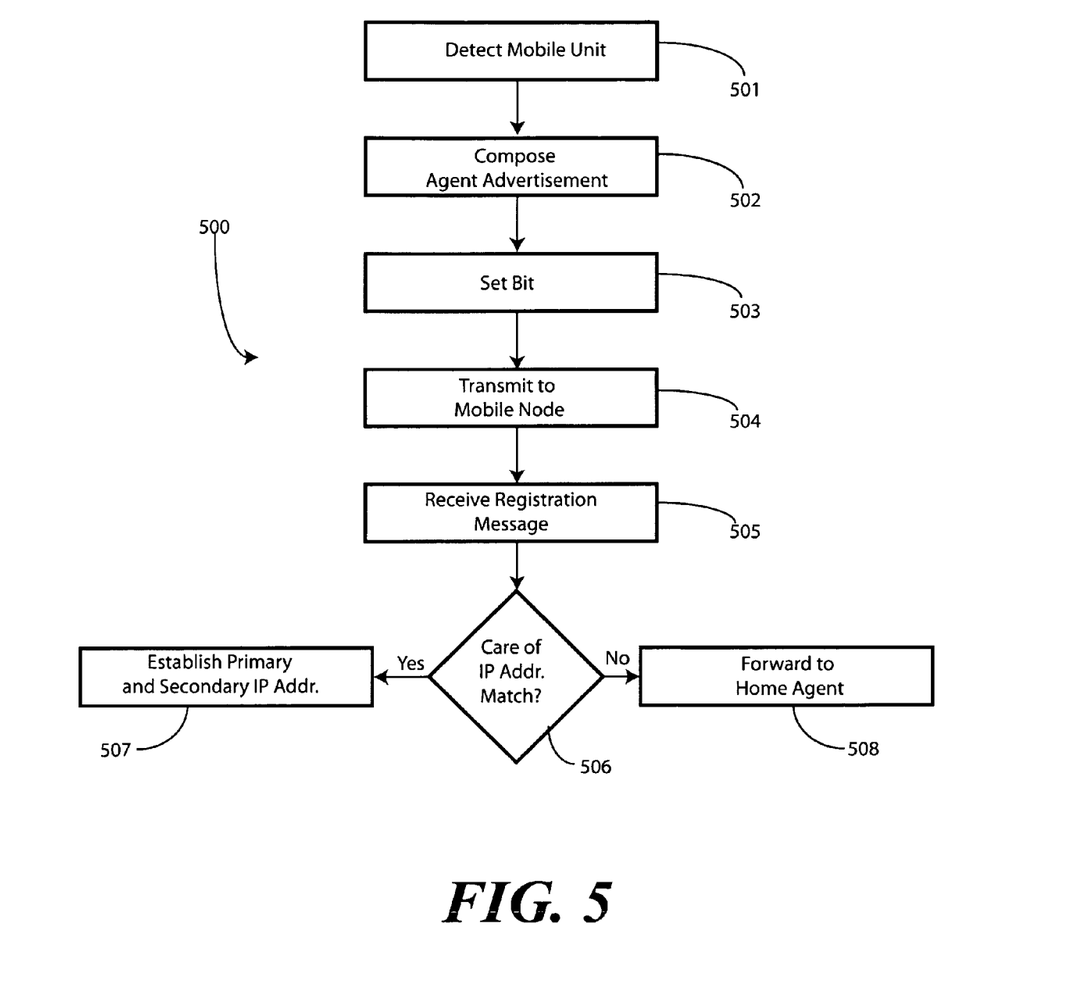
FIG. 5 illustrates one method of a multiple IP address agent establishing communication with a mobile node in accordance with embodiments of the invention.

Turning now to FIG. 5, illustrated therein is one method 500, suitable for use with a foreign agent (104) as executable code operable with a foreign agent processor, router, or similar device, for sending an agent advertisement (400) in accordance with embodiments of the invention. At step 501, the foreign agent (104) detects the presence of the mobile node (101). This detection can be in response to the mobile node (101) attempting to communicate with a transceiver of the network (111) associated with the foreign agent (104), or by other means.

At step 502, the foreign agent (104) composes the agent advertisement (400). As noted above, this step of composition can include providing information in the agent advertisement (400) that is provided as one or more flag bits (405) in the fields of the agent advertisement (400) that are indicative of whether the network (111) associated with the foreign agent (104) is multiple IP address interface compatible. Specifically, where the network (111) is multiple IP address interface compatible, the foreign agent (104) sets one of the one or more flag bits (405) so as to indicate that the network (111) is multiple IP address interface compatible at step 503. The agent advertisement (400) is then transmitted to the mobile node (101) at step 504.

As noted in the discussion of FIG. 4, in one embodiment the agent advertisement (400) transmitted at step 504 includes one or more ICMP router advertisement fields (401) and a mobility agent advertisement extension (402). The mobility agent advertisement extension (402) includes a registration lifetime field (403) and the one or more flag bits (404), which in one embodiment are on or between the $25^{th}$ bit and the $32^{nd}$ bit of the mobility agent advertisement extension (402). In one embodiment, the particular bit that indicates multiple IP address interface capability is the $25^{th}$ bit of the mobility agent advertisement extension (402).

At step 505, the foreign agent (104) receives a registration message (106) from the mobile node (101). The foreign agent then examines the registration message (106) for a care of IP address (406) and, where present, determines whether the care of IP address corresponds to the foreign agent (104) at decision 506. Where the care of IP address (406) does correspond to the foreign agent (104), the foreign agent (104) establishes both a primary IP address for the mobile node (101) and a secondary IP address for the mobile node (101) with its bearer manager at step 507. Where the care of IP address (406) fails to correspond with the foreign agent (104), the foreign agent (104) forwards the registration message (106) to the home agent (103) to establish a secondary IP address for the mobile node (101) with the home agent (103) at step 508.

Figure 6:
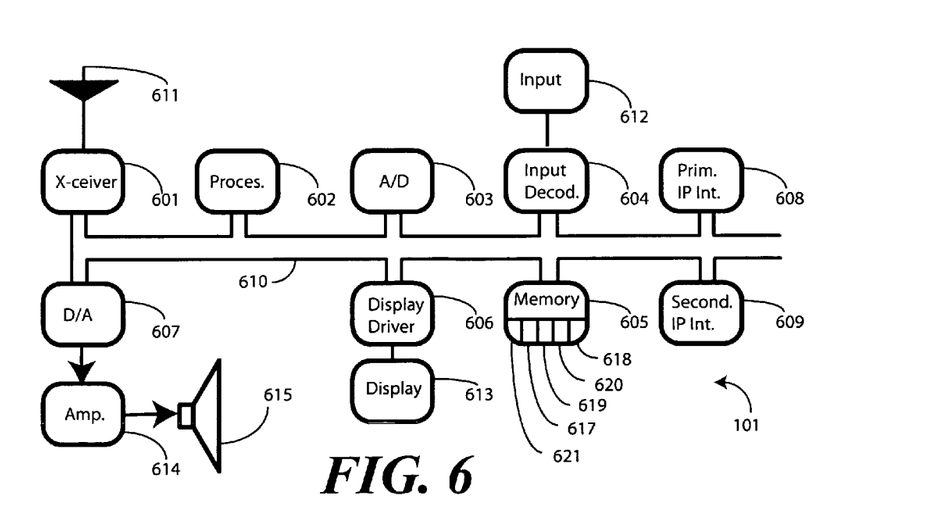
FIG. 6 illustrates one embodiment of a mobile node in accordance with the invention.

Turning now to FIG. 6, illustrated therein is a block diagram of one embodiment of a mobile node 101 configured for communication with both a multiple IP address interface compatible network and a non-multiple IP address interface compatible network in accordance with embodiments of the invention. The mobile node 101 comprises a transceiver 601, a processor 602, an analog to digital converter (A/D) 603, a input decoder 604, a memory 605, a display driver 606, a digital to analog converter (D/A) 607, a primary IP interface 608, and a secondary IP interface 609, all coupled together through a digital signal bus 610.

The transceiver 601 is coupled to the antenna 611 and is configured to communicate with both home agents (103) and foreign agents (104) as the mobile node moves from network to network or region to region. Carrier signals that are modulated by datagrams, e.g., digitally encoded signals for encoded voice, audio, text, or other communication, pass between the antenna 611, and the transceiver 601.

The input device 612 is coupled to the input decoder 604. The input decoder 604 serves to identify depressed keys, for example, and provide information identifying each depressed key to the processor 602. The display driver 606 is coupled to a display 613.

The D/A 607 is coupled through an audio amplifier 614 to a speaker 615 and, in one embodiment, an optional vibratory motor 616. The D/A 607 converts decoded digital audio to analog signals and drives the speaker 615. The audio amplifier 614 may comprise a plurality of amplifiers with each driving a separate speaker combination.

The memory 605 serves as a storage device and is also used to store executable code in the form of programs that control aspects of the operation of the mobile node 101. The memory 605 is a form of computer readable medium. The memory 605 further can be used to store the primary IP address 617 and the secondary IP address 618 that are used by the primary IP interface 608 and secondary IP interface 609, respectively.

The executable code stored in the memory 605, includes various modules that can be used in determining whether a particular network is multiple IP address interface compatible. In one embodiment, the memory 605 stores both a reception module 619 and a detection module 620, which are operable with the processor 602.

The reception module 619 is configured to receive the agent advertisement (400) from the foreign agent (104). The detection module 620 is configured to inspect the agent advertisement (400) so as to determine whether the one or more flag bits (404) of the agent advertisement (400) indicates that the network (111) associated with the foreign agent (104) is multiple IP address interface compatible.

The processor 602, in one embodiment, is configured to execute the various modules. For instance, the processor 602 is coupled to the transceiver 601, and is configured to exchange datagrams with the foreign agent (104). One such datagram is the agent advertisement (400), which the processor 602 exchanges by executing the reception module 619 stored in memory.

In addition to the reception module 619 and the detection module 620, in one embodiment the mobile node 101 also includes an IP address management module 621. The IP address management module 621 is responsible for several functions of the mobile node 101. For instance, in one embodiment, the IP address management module 621 is configured to employ the primary IP address 617 and the secondary IP address 618, in conjunction with the primary IP interface 608 and the secondary IP interface 609, for the dual-IP address anchoring datagram communication described above. This can include the establishment of the primary IP address 617 with the foreign agent (104) when the primary IP address does not yet exist. This can further include the establishment of a second IP address with the home agent (103) through the foreign agent (104).

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. In a mobile node, a method of determining whether a network associated with a foreign agent is multiple IP-address interface compatible, the method comprising the steps of:
receiving an agent advertisement from the foreign agent, the agent advertisement including information provided as one or more flag bits of one or more fields of the agent advertisement, wherein one of the one or more flag bits is indicative of the network being multiple IP-address interface compatible, with one IP-address being acquired from and anchored in a home network and another IP-address being acquired from and anchored in the network of the foreign agent; and
reading the agent advertisement to determine whether the one of the one or more flag bits indicates a dual anchoring multiple IP-address interface compatibility;
wherein when the one of the one or more flag bits indicates the dual anchoring multiple IP-address interface compatibility, configuring the mobile node for communication with the network;
wherein the step of configuring the mobile node for communication with the network comprises the steps of:
examining a primary mobile node IP interface to determine whether a primary IP address has been assigned; and
where the primary IP address has not been assigned, requesting the primary IP address from the foreign agent.

2. The method of claim 1, further comprising the step of requesting a secondary IP address for a secondary mobile node IP interface with a home agent through the foreign agent.

3. The method of claim 2, further comprising the step of selectively employing one of the primary IP address or the secondary IP address for datagram communication.

4. The method of claim 1, wherein the agent advertisement comprises one or more Internet control message protocol (ICMP) router advertisement fields and a mobility agent advertisement extension comprising a registration lifetime field and the one or more flag bits.

5. The method of claim 4, wherein the one of the one or more flag bits comprises a bit occurring at or between a $25^{th}$ bit and a $32^{nd}$ bit of the mobility agent advertisement extension.

6. The method of claim 5, wherein the one of the one or more flag bits comprises the $25^{th}$ bit of the mobility agent advertisement extension.

7. The method of claim 1, wherein when the one of the one or more flag bits fails to indicate the dual anchoring multiple IP-address interface compatibility, configuring the mobile node for communication with a non-multiple IP-address interface compatible network by employing a single IP address for datagram communication.

8. The method of claim 1, wherein the network is an Advanced Internet Multimedia Standard (A-IMS) network.

9. In a foreign agent, a method of sending an agent advertisement, the method comprising the steps of:
detecting a mobile node;
composing the agent advertisement, wherein the agent advertisement comprises information provided as one or more flag bits of one or more fields of the agent advertisement, wherein one of the one or more flag bits is indicative of whether a network associated with the foreign agent is multiple IP-address interface compatible where one IP-address of the mobile node is anchored in a home network and another IP-address of the mobile node is anchored in the network associated with the foreign agent;
setting the one of the one or more flag bits so as to indicate whether the network associated with the foreign agent is multiple IP-address interface compatible;
sending the agent advertisement to the mobile node;
receiving a registration message from the mobile node;
examining the registration message for a care-of IP address; and
where the care-of IP address corresponds to the foreign agent, establishing both a primary IP address and a secondary IP address for the mobile node.

10. The method of claim 9, wherein the agent advertisement comprises one or more Internet control message protocol (ICMP) router advertisement fields and a mobility agent advertisement extension, wherein the mobility agent advertisement extension comprises a registration lifetime field and the one or more flag bits.

11. The method of claim 10, wherein the one of the one or more flag bits comprises a bit occurring at or between a $25^{th}$ bit and a $32^{nd}$ bit of the mobility agent advertisement extension.

12. The method of claim 11, wherein the one of the one or more flag bits comprises the $25^{th}$ bit of the mobility agent advertisement extension.

13. The method of claim 9, further comprising the steps of:
where the care-of IP address fails to correspond to the foreign agent, forwarding the registration message to a home agent to establish the secondary IP address with the home agent.

14. A mobile node configured for communication with both multiple IP-address interface compatible networks and non-multiple IP-address interface compatible networks, the mobile node comprising:
a transceiver configured to communicate with remote foreign agents; a storage device; a processor coupled to the transceiver and the storage device, the processor
being configured to exchange datagrams with the remote foreign agents and to execute one or more instruction modules stored in the storage device, wherein the one or more instruction modules comprise:
a reception module configured to receive an agent advertisement from a foreign agent, the agent advertisement including information provided as one or more flag bits of one or more fields of the agent advertisement, wherein one of the one or more flag bits is indicative of a network associated with the foreign agent being multiple IP-address interface compatible, with one IP-address being acquired from and anchored in a home network and another IP-address being acquired from and anchored in the network of the foreign agent; and
a detection module configured to inspect the agent advertisement so as to determine whether the one of the one or more flag bits indicates a multiple IP-address interface compatibility of the network associated with the foreign agent;
wherein the one or more instruction modules further comprises an IP address management module configured to employ multiple IP addresses for dual-IP address anchoring datagram communication;
wherein the IP address management module is further configured to establish a primary IP address with the foreign agent when the primary IP address does not yet exist.

15. The mobile node of claim 14, wherein the IP address management module is further configured to establish a second IP address with a home agent.

* * * * *